May 24, 1966 B. I. BLICKMAN ETAL 3,252,258
TEMPERATUE CONTROLLED ENVIRONMENTAL ENCLOSURE
WITH MODULAR PANELS
Filed April 6, 1964 3 Sheets-Sheet 1
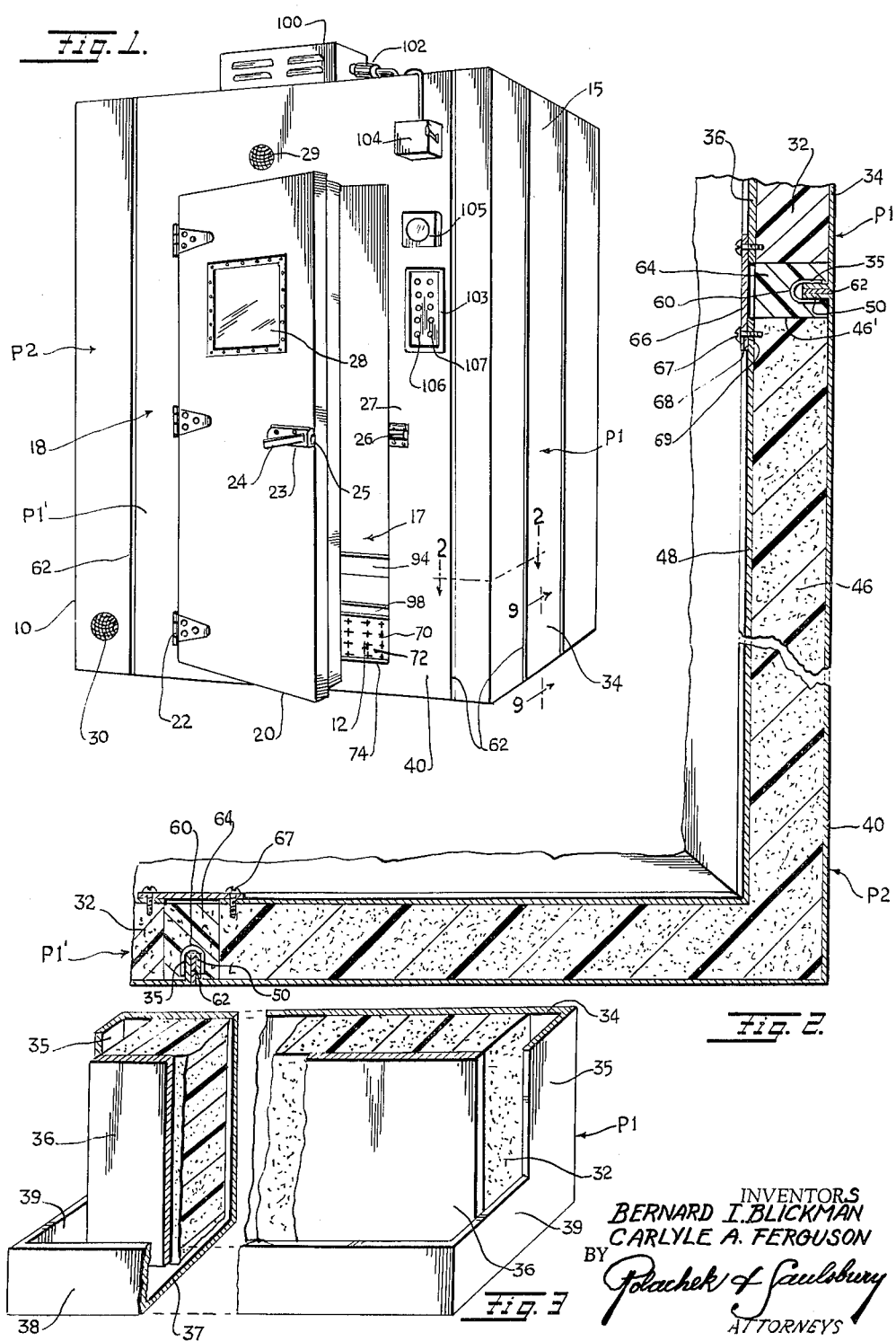
INVENTORS
BERNARD I. BLICKMAN
CARLYLE A. FERGUSON
BY Polachek of Saulsbury
ATTORNEYS

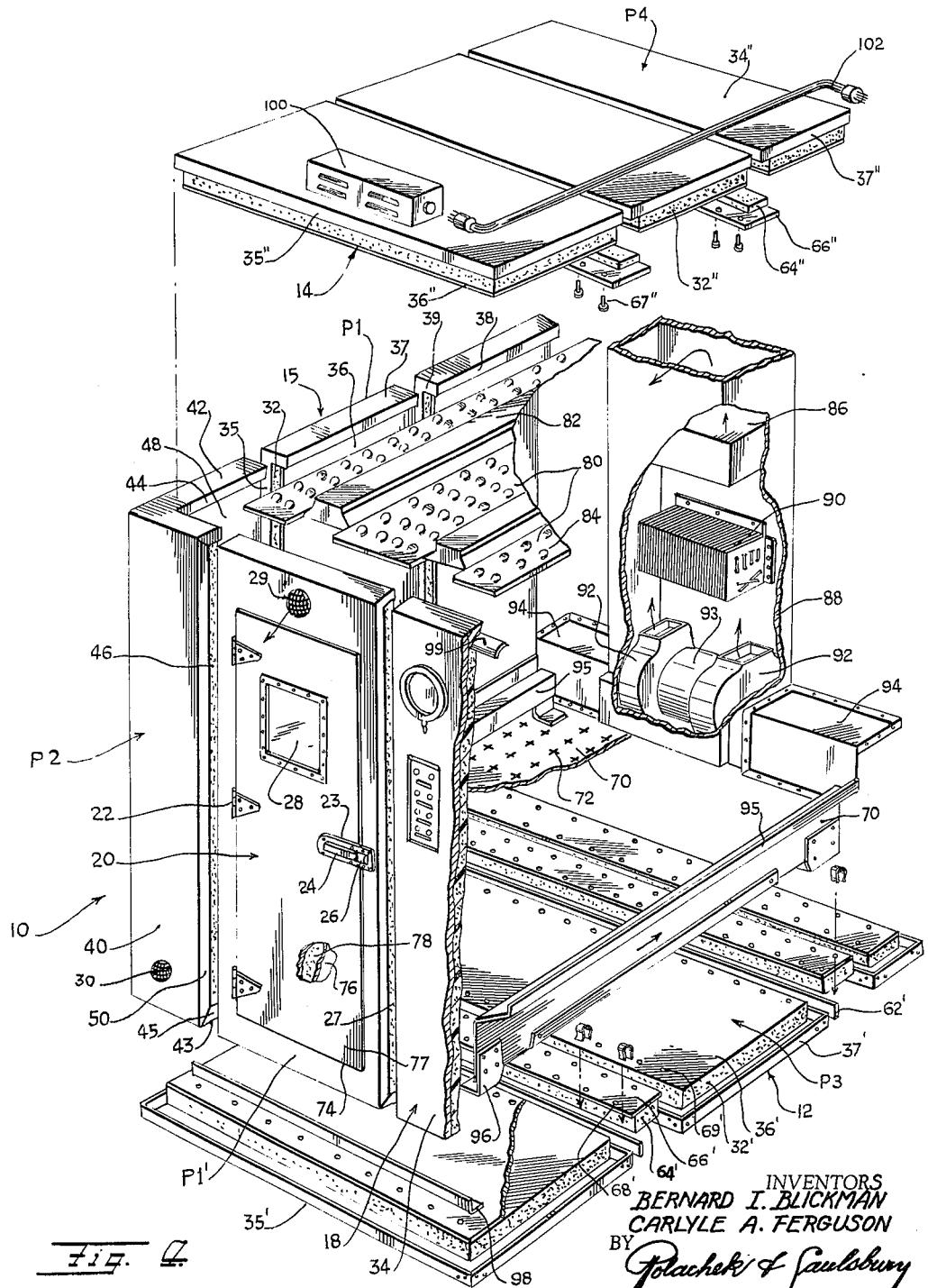

May 24, 1966  B. I. BLICKMAN ETAL  3,252,258
TEMPERATURE CONTROLLED ENVIRONMENTAL ENCLOSURE
WITH MODULAR PANELS
Filed April 6, 1964                                          3 Sheets-Sheet 3
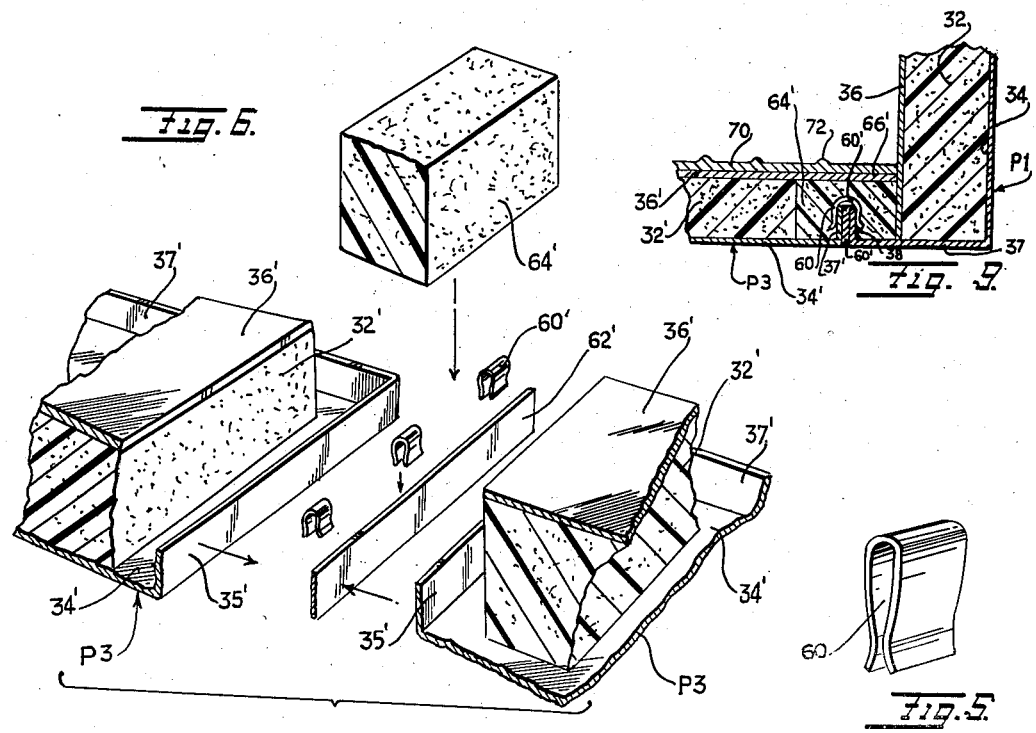
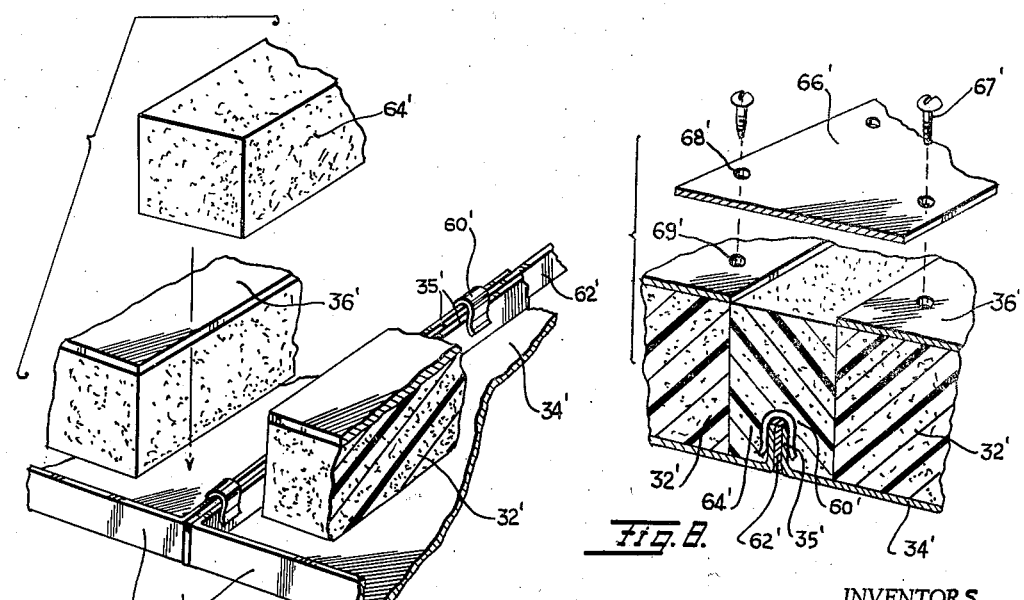
INVENTORS
BERNARD I. BLICKMAN
CARLYLE A. FERGUSON
BY
Polachek & Saulsbury
ATTORNEYS

United States Patent Office 3,252,258
Patented May 24, 1966

3,252,258
TEMPERATURE CONTROLLED ENVIRONMENTAL ENCLOSURE WITH MODULAR PANELS
Bernard I. Blickman, New York, N.Y., and Carlyle A. Ferguson, Ramsey, N.J., assignors to S. Blickman, Inc., Weehawken, N.J.
Filed Apr. 6, 1964, Ser. No. 357,567
10 Claims. (Cl. 52—204)

This invention relates to an improved construction for a closed environmental enclosure or room wherein temperature and humidity are controlled over specified ranges.

According to the invention, there is provided a rectangular, closed enclosure having walls, roof, floor and door panels made of blocks of foam plastic encased inside and out in sheet metal such as aluminum. The panels are modular in construction and arranged so that the enclosure can be erected by means of pressure fittings forming vapor-tight thermally insulated seals between adjacent panels. The panels are sealed to one another by synthetic rubber gaskets. The panels are rigid and self-supporting. Provision is made for lighting and ventilation in the enclosure. Heating and refrigeration devices are provided inside the enclosure. Devices for humidification and dehumidification located outside the enclosure may be connected to the enclosure. Automatic controls for environmental conditions inside the enclosure are provided on the outside of the enclosure.

It is a principal object of the invention to provide an environmental enclosure or room having walls, floor and roof formed of modular thermally insulated panels.

Another object is to provide an enclsoure as described with vapor-tight, thermally insulated pressure seals at joints between panels.

A further object is to provide an enclosure as described with thermally insulated modular corner panels joined to flat panels at the walls, floor and roof with vapor-tight, thermally insulated, pressure seals.

Still another object is to provide a novel joint construction for modular panels of an environmental enclosure.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is an external perspective view of an environmental enclosure embodying the invention.

FIG. 2 is an enlarged sectional view taken on line 2—2 of FIG. 1, parts being broken away.

FIG. 3 is an enlarged perspective view partly in section of parts of a wall panel.

FIG. 4 is an exploded perspective view of parts of the environmental enclosure, portions being broken away.

FIG. 5 is an enlarged perspective view of a clip employed in joining panels.

FIG. 6 is an exploded perspective view of parts of a floor panel joint assembly, portions being shown in section and parts being broken away.

FIG. 7 is an exploded perspective view of the joint assembly of FIG. 6 at a further stage of assembly, taken 180° from the position of FIG. 6.

FIG. 8 is an exploded perspective view partially in section of part of a floor joint assembly.

FIG. 9 is an enlarged sectional view taken on line 9—9 of FIG. 1.

Referring first to FIGS. 1–4, there is shown the environmental enclosure 10 including horizontal floor 12 and roof 14, vertical opposing side walls 15, rear wall 17 and front wall 18. A door 20 closes opening 21 in the front wall 18. The door is mounted on hinges 22 and is held closed by a latch 23 provided with an operating handle 24. The latch has bolt 25 engageable with a catch member 26 on the door jamb 27 of wall 18. In the door is a double-pane window 28 providing a view into the interior of the enclosure. Above the door is a screened opening 29 for exhausting air from the enclosure. An air inlet 30 is provided near the bottom of wall 18 to the left of the door as viewed in FIG. 1.

The walls 15 are assembled from flat rectangular modular panels P1; see FIGS. 1–4 and 9. Each of the wall panels P1 has a flat, rigid rectangular core 32 made of closed cell expanded plastic such as polystyrene, polyurethane, or the like. On the outer side of each wall panel is a metal sheet or plate 34 preferably made of aluminum. A similar metal plate 36 is provided on the inner side of each wall panel. The plates 34 and 36 are bonded to opposite sides of the core 32 to form a rigid structure. Lateral edges of the outer plate 34 are extended beyond opposite vertical edges of core 32 and then are turned inwardly to form flanges 35 spaced from the lateral edges of core 32. Upper and lower horizontal end flanges 37 extend inwardly from the opposite horizontal top and bottom edges of plate 34. Narrow vertical edge flanges 38 are bent upwardly into a vertical plane at the inner edges of flanges 37. The end flanges 37 are wider than the thickness of core 32 so that flanges 38 are spaced from and parallel to the inner faces of cores 32 which are covered by inner plates 36. Extension flanges 39 at ends of flanges 35 extend inwardly and are welded to flanges 38. This arrangement of the end flanges forms a very strong box-like structure so that the wall panels P1 are self supporting.

Rigid, self-supporting panels P2 are provided at the corners of the enclosure. Each of these panels, as shown in FIGS. 1, 2 and 4, has an outer vertical sheet metal plate 40 which is L-shaped in horizontal cross section. At the top and bottom ends of the panel are horizontal L-shaped flanges 42, 43 which extend inwardly of plate 40. The inner edges of flanges 42, 43 are turned respectively downwardly and upwardly to form a depending top flange 44 and a similar upright bottom flange 45. An expanded rigid plastic core 46 is bonded to the inner side of plate 40. This core is L-shaped in cross section as clearly shown in FIG. 2. Bonded to the inner side of core 46 is an inner plate 48 which is also L-shaped in cross section. Opposite lateral edges of plate 40 extend beyond core ends 46' and are bent inwardly to form integral vertical flanges 50 which are wider than the thickness of core 46. Opposite ends of flanges 50 are welded to ends of flanges 44, 45 to form a rigid box-like structure which is L-shaped in horizontal cross section. Flanges 44, 45 are spaced inwardly from core 46 and plate 48.

The wall panels P1 are secured to the corner panels P2 in coplanar disposition by means of U-shaped spring clips 60 best shown in FIGS. 2, 4 and 6. These clips are secured on facing vertical flanges 35 and 50 of adjacent abutting panels P1, P2. Between each pair of abutted flanges 35, 35 is disposed a resilient, non-porous gasket strip 62 running the full length of the panels. A flexible, expanded plastic filler block 64 is inserted between spaced ends of the cores 32, 46 and receives the clips 60, flanges 35, 35 and gasket strip 62 in a vapor-tight joint. A cover plate 66 covers the inner side of filler block 64 and is held in place by screws 67 passing through holes 68, 69 at the edges of plate 66 and plates 36, 48. The opposite edges of plate 66 overlays and abuts inner sides of the adjacent edges of plates 36, 38.

The floor 12 of the enclosure is formed by horizontal panels P3 best shown in FIGS. 4, 6–9. The structure of these panels is generally similar to panels P1 and corresponding parts are indicated by primed numbers. Bottom rectangular plates 34' have upturned long vertical flanges 35' which are abutted and secured together by U-shaped clips 60' with resilient gasket strips 62 interposed between flanges 35'. A resilient filler block 64' is disposed between spaced edges of adjacent cores 32' to which plates 34' are bonded. Cover plates 66' are secured by screws 67' to floor plates 36' which are bonded to upper sides of cores 32'. The plates 66', 36' have registering holes 68', 69' receiving screws 67'. The ends of floor panels P3 have upturned flanges 37' spaced from ends of the cores 32'. These flanges are secured by clips 60' to flanges 38 of panels P1 with resilient gasket strips 60' therebetween as shown in FIG. 9. The vapor-tight joints are completed with resilient filler blocks 64' covered by plates 66'. The joint structure between the floor panels P3 and the corner panels P2 is the same as shown in FIG. 9 between panels P1 and P3. A thick floor plate 70 having projections 72 thereon to provide a non-skid upper surface may be installed over the floor panels P3 as shown in FIGS. 1, 3 and 9.

The roof 14 of the enclosure is made of modular panels P4 which are identical to panels P3 as shown in FIG. 4 and corresponding parts have identical double-primed numbers. The expanded plastic cores 32" are bonded to the undersides of roof plates 34". At the undersides of the cores are bonded interior plates 36". Flanges 37" are formed at the ends of plates 34" and flanges 35" are formed at the sides of the plates 34". The panels P4 are secured together by clips and resilient gasket strips as in the vapor-tight joints of panels P1, P2 and P3. Flexible filler blocks 64" and cover plates 66" secured by screws 67" complete the roof joint assemblies. The flanges 35" and 37" of the end panels P4 are secured to the flanges 38 and 44 at the top of panels P1 and P2 in vapor-tight joints similar to those of panels P1, P2 and P3.

The front wall 18 of the enclosure has a wall panel P1' which is similar to panel P1 except that an opening 74 is provided for mounting door 20. Inner edges of this aperture are provided with inturned flanges 74. Opposite ends of panel P1' are joined to corner panels P2 as explained above in connection with panels P1 and P2, and as shown in FIG. 2. Door 20 has an inner wall plate 76, outer plate 77 and inner expanded plastic core 78. It hermetically seals opening 74 when closed and locked.

A plenum chamber or compartment may be provided beneath the roof 14 by a plurality of plates or panels 80 between which are fluorescent lamp fixtures 82. The panels 80 and lamp fixtures 82 are secured to and supported by the roof panels P4 in any suitable manner. Louvers or apertures 84 are provided in the plenum chamber for distributing air uniformly at the top of the enclosure.

Heated air is provided by an electric heater 86 located in a duct 88 which opens into the plenum chamber; see FIG. 4. Beneath the heater are cooling coils 90 of a refrigeration unit (not shown) which is located at the back of the enclosure and extends outside of the enclosure through an opening in one of the panels of rear wall 17. The refrigeration unit is connected to an external exhaust system (not shown) for venting heated air.

An air draft for the cooling coils 90 and the heater 86 is provided by a double ar blower 92 driven by a motor 93 located at the bottom of duct 88. Air intake ducts 94 are connected to the bottom of duct 88. A pair of channels 95 are located at sides of the enclosure and are supported above the floor on brackets 96. These ducts conduct air to ducts 94 and circulate humidified or dehumidified air from inlet 30. Cove moldings 98 and 99 may be provided all around the floor 12 and the roof 14. Molding 98 facilitates cleaning the floor at its edges.

On the roof 14 is provided an electrical junction box 100. This box contains relays for control of components inside the enclosure. A power cable 102 is connected to this box to supply electric power. A switch box 104 on front wall 18 is connected to box 100. A temperature recorder 105 is also located on the front wall 18 for recording temperatures inside the enclosure 10. Below recorder 105 is a control panel 103 with push buttons 106 for controlling components inside the enclosure 10. Indicating lights 107 may be provided adjacent to the push buttons to indicate the operating condition of components inside the enclosure. Suitable humidifying and dehumidifying apparatus (not shown) can be connected to inlet 30 for controlling the humidity of air inside the enclosure.

The enclosure described is arranged so that all walls, the floor, roof, and door are thermally insulated by thick, rigid cellular cores covered inside and out by metal plates. The thermal insulation is continuous at all joints which are vapor-tight and flush with outer walls. The door hermetically seals the panel opening 74 when the door is closed. Thus it is possible to control completely the temperature and humidity of air within the enclosure.

The enclosure has a modular panel construction so that it can easily be made in larger or smaller sizes depending on requirements. Although only one wall panel P1 is shown between corner panels P2 in the side 15 of the enclosure 10 of FIG. 1, two or more wall panels P1 can readily be provided and connected to the corner panels P2. The floor and roof panels P3, P4 can similarly be enlarged.

The use of panels with sheet metal covering and expanded plastic cores results in a lightweight construction which is very satisfactory and economical for the purposes intended. In addition to having excellent thermal insulation qualities, the panels are chemically stable, moistureproof, noncorrosive, durable and very long lasting. The vapor-tight joints have similar qualities. They have the advantage of rapid assembly with no special tools or skill being required. An enclosure as described can be set up or taken down very quickly. All panel parts are prefabricated and interchangeable.

The environmental enclosure construction described can be used for setting up refrigerated rooms, incubator rooms, humidity rooms, sub-zero rooms, etc.

While we have illustrated and described the preferred embodiments of my invention, it is to be understood that we do not limit ourselves to the precise constructions herein disclosed and that various changes and modifications may be made within the scope of the invention as defined in the appended claims.

Having thus described our invention, what we claim as new, and desire to secure by United States Letters Patent is:

1. A closed environmental enclosure of the type described, comprising a room having front and rear walls, side walls, horizontal roof and horizontal floor, a plurality of panels forming said walls, roof and floor, each of said panels having a rigid cellular plastic thermally insulated core, sheet metal plates bonded to opposite sides of said core, one plate on the outer side of said core extending outwardly beyond each edge of the core and terminating in a flange turned inwardly toward the other plate, ends of flanges on adjacent edges being secured to each other to define a rigid, self-supporting panel structure, each flange of each panel being abutted to a flange of an adjacent panel with a resilient gasket strip therebetween, spring clip means securing the abutted flanges together to form a vapor-tight, pressure-sealed joint, and a resilient cellular plastic thermally insulated block disposed between adjacent ends of each pair of cores of adjacent panels, said block enclosing the spring clip means, gasket strip and abutted flanges of the sealed joint and providing continuous thermal insulation with adjacent cores at the sealed joint, whereby the roof is hermetically sealed to upper ends of the front, rear and side walls, the floor is hermetically sealed to lower ends of the front, rear and side walls, and the side walls are hermetically sealed to the front and rear walls.

2. A closed environmental enclosure of the type described, comprising a room having front and rear walls, side walls, horizontal roof and horizontal floor, a plurality of panels forming said walls, roof and floor, each of said panels having a rigid cellular plastic thermally insulated core, sheet metal plates bonded to opposite sides of said core, one plate on the outer side of said core extending outwardly beyond each edge of the core and terminating in a flange turned inwardly toward the other plate, ends of flanges on adjacent edges being secured to each other to define a rigid, self-supporting panel structure, each flange of each panel being abutted to a flange of an adjacent panel with a resilient gasket strip therebetween, spring clip means securing the abutted flanges together to form a vapor-tight, pressure-sealed joint, and a resilient cellular plastic thermally insulated block disposed between adjacent ends of each pair of cores of adjacent panels, said block enclosing the spring clip means, gasket strip and abutted flanges of the sealed joint and providing continuous thermal insulation with adjacent cores at the sealed joint, whereby the roof is hermetically sealed to upper ends of the front, rear and side walls, the floor is hermetically sealed to lower ends of the front, rear and side walls, and the side walls are hermetically sealed to the front and rear walls, one panel in the front wall having a rectangular opening therein, and a door mounted on hinges and hermetically sealing said opening when the door is closed, said door including another rigid cellular plastic thermally insulated core, and other sheet metal plates bonded to opposite sides of said other core, so that the room is completely thermally insulated when the door is closed.

3. An environmental enclosure of the type described, comprising a closed room having front and rear walls, opposing side walls, a horizontal floor and a horizontal roof, each of said walls, floor and roof including at least one flat panel having a rigid cellular plastic thermally insulated flat rectangular core, an outer sheet metal plate covering and secured to the outside of the core, said plate extending beyond each edge of the core and having a flange turned inwardly at each edge of the plate, a plurality of vertical corner panels, each corner panel being located at a different corner of the room, each corner panel being L-shaped in horizontal cross section and having a rigid cellular plastic thermally insulated other core which is L-shaped in horizontal cross section, another outer sheet metal plate covering and secured to the outside of the other core, said other plate extending beyond each edge of the other core and having another flange turned inwardly at each edge of the other plate, each of the other flanges of the corner panels being abutted to a different one of the flanges of an adjacent one of the flat panels at the walls, floor and roof of the room, a plurality of resilient non-porous gasket strips, each of said strips being interposed between a pair of abutted flanges, a plurality of spring clips securing the abutted flanges together at said strip in a vapor-tight, pressure-sealed joint, a plurality of resilient cellular plastic thermally insulated filler blocks, each of the blocks being disposed between adjacent ends of spaced cores of each pair of adjacent planes, said block enclosing the spring clips, gasket strip and abutted flanges of the sealed joint to provide continuous thermal insulation with adjacent cores at the sealed joint.

4. An environmental enclosure of the type described, comprising a closed room having front and rear walls, opposing side walls, a horizontal floor and a horizontal roof, each of said walls, floor and roof including at least one flat panel having a rigid cellular plastic thermally insulated flat rectangular core, an outer sheet metal plate covering and secured to the outside of the core, said plate extending beyond each edge of the core and having a flange turned inwardly at each edge of the plate, a plurality of vertical corner panels, each corner panel being located at a different corner of the room, each corner panel being L-shaped in horizontal cross section and having a rigid cellular plastic thermally insulated other core which is L-shaped in horizontal cross section, another outer sheet metal plate covering and secured to the outside of the other core, said other plate extending beyond each edge of the other core and having another flange turned inwardly at each edge of the other plate, each of the other flanges of the corner panels being abutted to a different one of the flanges of an adjacent one of the flat panels at the walls, floor and roof of the room, a plurality of resilient non-porous gasket strips, each of said strips being interposed between a pair of abutted flanges, a plurality of spring clips securing the abutted flanges together at said strip in a vapor-tight, pressure-sealed joint, a plurality of resilient cellular plastic thermally insulated filler blocks, each of the blocks being disposed between adjacent ends of spaced cores of each pair of adjacent panels, said block enclosing the spring clips, gasket strip and abutted flanges of the sealed joint to provide continuous thermal insulation with adjacent cores at the sealed joint, and an inner sheet metal plate bonded to and covering the inside of each of the flat and corner panels.

5. An environmental enclosure of the type described, comprising a closed room having front and rear walls, opposing side walls, a horizontal floor and a horizontal roof, each of said walls, floor and roof including at least one flat panel having a rigid cellular plastic thermally insulated flat rectangular core, an outer sheet metal plate covering and secured to the outside of the core, said plate extending beyond each edge of the core and having a flange turned inwardly at each edge of the plate, a plurality of vertical corner panels, each corner panel being located at a different corner of the room, each corner panel being L-shaped in horizontal cross section and having a rigid cellular plastic thermally insulated other core which is L-shaped in horizontal cross section, another outer sheet metal plate covering and secured to the outside of the other core, said other plate extending beyond each edge of the other core and having another flange turned inwardly at each edge of the other plate, each of the other flanges of the corner panels being abutted to a different one of the flanges of an adjacent one of the flat panels at the walls, floor and roof of the room, a plurality of resilient non-porous gasket strips, each of said strips being interposed between a pair of abutted flanges, a plurality of spring clips securing the abutted flanges together at said strip in a vapor-tight, pressure-sealed joint, a plurality of resilient cellular plastic thermally insulated filler blocks, each of the blocks being disposed between adjacent ends of spaced cores of each pair of adjacent panels, said block enclosing the spring clips, gasket strip and abutted flanges of the sealed joint to provide continuous thermal insulation with adjacent cores at the sealed joint, one panel in the front wall having a rectangular opening therein, and a door mounted on hinges and hermetically sealing said opening when the door is closed, said door including another rigid cellular plastic thermally insulated core, and other sheet metal plates bonded to opposite sides of said other core, so that the room is completely thermally insulated when the door is closed.

6. An environmental enclosure of the type described, comprising a closed room having front and rear walls, opposing side walls, a horizontal floor and a horizontal roof, each of said walls, floor and roof including at least one flat panel having a rigid cellular plastic thermally insulated flat rectangular core, an outer sheet metal plate covering and secured to the outside of the core, said plate extending beyond each edge of the core and having a flange turned inwardly at each edge of the plate, a plurality of vertical corner panels, each corner panel being located at a different corner of the room, each corner panel being L-shaped in horizontal cross section and having a rigid cellular plastic thermally insulated other core which is L-shaped in horizontal cross section, another outer sheet metal plate covering and secured to the outside of the other core, said other plate extending beyond each edge of the other core and having another flange turned inwardly at each edge of the other plate, each of the other flanges of the corner panels being abutted to a different one of the flanges of an adjacent one of the flat panels at the walls, floor and roof of the room, a plurality of resilient non-porous gasket strips, each of said strips being interposed between a pair of abutted flanges, a plurality of spring clips securing the abutted flanges together at said strip in a vapor-tight, pressure-sealed joint, a plurality of resilient cellular plastic thermally insulated filler blocks, each of the blocks being disposed between adjacent ends of spaced cores of each pair of adjacent panels, said block enclosing the spring clips, gasket strip and abutted flanges of the sealed joint to provide continuous thermal insulation with adjacent cores at the sealed joint, and an inner sheet metal plate bonded to and covering the inside of each of the flat and corner panels, one panel in the front wall having a rectangular opening therein, and a door mounted on hinges and hermetically sealing said opening when the door is closed, said door including another rigid cellular plastic thermally insulated core, and other sheet metal plates bonded to opposite sides of said other core, so that the room is completely thermally insulated when the door is closed.

7. In a closed environmental enclosure of the type described, a wall comprising a plurality of panels, each of said panels having a rigid cellular plastic thermally insulated core, sheet metal plates bonded to opposite sides of said core, one plate on the outer side of said core extending outwardly beyond each edge of the core and terminating in a flange turned inwardly toward the other plate, ends of flanges on adjacent edges being secured to each other to define a rigid, self-supporting panel structure, each flange of each panel being abutted to a flange of an adjacent panel with a resilient gasket strip therebetween, spring clip means securing the abutted flanges together to form a vapor-tight, pressure-sealed joint, and a resilient cellular plastic thermally insulated block disposed between adjacent ends of each pair of cores of adjacent panels, said block enclosing the spring clip means, gasket strip and abutted flanges of the sealed joint and providing continuous thermal insulation with adjacent cores at the sealed joint, whereby the panels form a rigid structure which is continuously thermally insulated throughout.

8. In a closed environmental enclosure of the type described, a wall comprising a plurality of panels, each of said panels having a rigid cellular plastic thermally insulated core, sheet metal plates bonded to opposite sides of said core, one plate on the other side of said core extending outwardly beyond each edge of the core and terminating in a flange turned inwardly toward the other plate, ends of flanges on adjacent edges being secured to each other to define a rigid, self-supporting panel structure, each flange of each panel being abutted to a flange of an adjacent panel with a resilient gasket strip therebetween, spring clip means securing the abutted flanges together to form a vapor-tight, pressure-sealed joint, and a resilient cellular plastic thermally insulated block disposed between adjacent ends of each pair of cores of adjacent panels, said block enclosing the spring clip means, gasket strip and abutted flanges of the sealed joint and providing continuous thermal insulation with adjacent cores at the sealed joint, whereby the panels form a rigid structure which is continuously thermally insulated throughout, one panel at each end of the wall being L-shaped in horizontal cross section to define a right-angled corner for said enclosure.

9. A closed environmental enclosure of the type described, comprising a room having front and rear walls, side walls, horizontal roof and horizontal floor, a plurality of panels forming said walls, roof and floor, each of said panels having a rigid cellular plastic thermally insulated core, sheet metal plates bonded to opposite sides of said core, one plate on the outer side of said core extending outwardly beyond each edge of the core and terminating in a flange turned inwardly toward the other plate, ends of said flanges on adjacent edges being secured to each other to define a rigid, self-supporting panel structure, each flange of each panel being abutted to a flange of an adjacent panel with a resilient gasket strip therebetween, spring clip means securing the abutted flanges together to form a vapor-tight, pressure-sealed joint, and a resilient cellular plastic thermally insulated block disposed between adjacent ends of each pair of cores of adjacent panels, said block enclosing the spring clip means, gasket strip and abutted flanges of the sealed joint and providing continuous thermal insulation with adjacent cores at the sealed joint, one panel at each end of each of the walls being L-shaped in horizontal cross section to define a right-angled corner for the room, whereby the roof is hermetically sealed to upper ends of the front, rear and side walls, the floor is hermetically sealed to lower ends of the front, rear and side walls, and the side walls are hermetically sealed to the front and rear walls.

10. A closed environmental enclosure of the type described, comprising a room having front and rear walls, side walls, horizontal roof and horizontal floor, a plurality of panels forming said walls, roof and floor, each of said panels having a rigid cellular plastic thermally insulated core, sheet metal plates bonded to opposite sides of said core, one plate on the outer side of said core extending outwardly beyond each edge of the core and terminating in a flange turned inwardly toward the other plate, ends of said flanges on adjacent edges being secured to each other to define a rigid, self-supporting panel structure, each flange of each panel being abutted to a flange of an adjacent panel with a resilient gasket strip therebetween, spring clip means securing the abutted flanges together to form a vapor-tight, pressure-sealed joint, and a resilient cellular plastic thermally insulated block disposed between adjacent ends of each pair of cores of adjacent panels, said block enclosing the spring clip means, gasket strip and abutted flanges of the sealed joint and providing continuous thermal insulation with adjacent cores at the sealed joint, one panel at each end of each of the walls being L-shaped in horizontal cross section to define a right-angled corner for the room, whereby the roof is hermetically sealed to upper ends of the front, rear and side walls, the floor is hermetically sealed to lower ends of the front, rear and side walls, and the side walls are hermetically sealed to the front and rear walls, one panel in the front wall having a rectangular opening therein, and a door mounted on hinges and hermetically sealing said opening when the door is closed, said door including another rigid cellular plastic thermally insulated core, and other sheet metal plates bonded to opposite sides of said other core, so that the room is completely thermally insulated when the door is closed.

References Cited by the Examiner

UNITED STATES PATENTS

| | | | |
|---|---|---|---|
| 2,029,817 | 2/1936 | Fegles | 52—393 X |
| 2,486,563 | 11/1949 | Jorgensen | 165—53 X |
| 2,916,261 | 12/1959 | Parkinson et al. | 165—56 |
| 3,082,487 | 3/1963 | Fowler et al. | 165—53 X |
| 3,115,819 | 12/1963 | Mahlmeister et al. | 98—31 XR |
| 3,186,526 | 6/1965 | Sidener | 52—404 |

FOREIGN PATENTS 690,271  4/1953  Great Britain.

FREDERICK L. MATTESON, JR., *Primary Examiner.*